(12) United States Patent
Torralba Valero

(10) Patent No.: US 12,478,175 B2
(45) Date of Patent: Nov. 25, 2025

(54) SELF-CONTAINED ORAL-DENTAL CLEANER

(71) Applicant: COCINA Y NUTRICIÓN SL, Valencia (ES)

(72) Inventor: Julio Torralba Valero, Valencia (ES)

(*) Notice: Subject to any disclaimer, the term of this patent is extended or adjusted under 35 U.S.C. 154(b) by 27 days.

(21) Appl. No.: 18/290,820

(22) PCT Filed: Jul. 13, 2022

(86) PCT No.: PCT/ES2022/000027
§ 371 (c)(1),
(2) Date: Jan. 22, 2024

(87) PCT Pub. No.: WO2023/002073
PCT Pub. Date: Jan. 26, 2023

(65) Prior Publication Data
US 2025/0089884 A1  Mar. 20, 2025

(30) Foreign Application Priority Data
Jul. 23, 2021 (ES) .......................... ES202131540U

(51) Int. Cl.
A46B 11/00 (2006.01)
A46B 5/00 (2006.01)
A46B 5/02 (2006.01)

(52) U.S. Cl.
CPC .......... *A46B 11/0055* (2013.01); *A46B 5/002* (2013.01); *A46B 5/021* (2013.01); *A46B 2200/1066* (2013.01)

(58) Field of Classification Search
CPC ..... A46B 11/0055; A46B 5/002; A46B 5/021; A46B 2200/1066; A46B 11/00; A46B 11/002
(Continued)

(56) References Cited

U.S. PATENT DOCUMENTS 6,609,848 B1 * 8/2003 Rosenberg ......... A46B 15/0071
401/148
6,669,390 B1 * 12/2003 Porter .................. A46B 11/002
401/286
(Continued)

FOREIGN PATENT DOCUMENTS

CN 211608491 U 10/2020
GB 2269090 A 2/1994
(Continued)

Primary Examiner — David J Walczak
(74) Attorney, Agent, or Firm — Patshegen IP; Moshe Pinchas

(57) ABSTRACT

Autonomous oral cleaner, comprising a head with a cleaning element, a container of a liquid cleaning fluid, and mechanism to carry the liquid fluid from the interior space of the container to the cleaning element in which a manual air pressure device participates, whose activation increases the pressure of the liquid fluid contained inside the container; The oral cleaner further includes a single whole set consisting of a first module that includes the head with the cleaning element, and a second module that includes the container the first and the second modules of the whole set have longitudinal and coaxial mobility relative to each other to move the fluid from the container to the cleaning element.

8 Claims, 7 Drawing Sheets

(58) Field of Classification Search
USPC .............................. 401/188 R, 270, 272, 275
See application file for complete search history.

(56) References Cited

U.S. PATENT DOCUMENTS

| | | | | |
|---|---|---|---|---|
| 6,719,471 B1 * | 4/2004 | Giro | ................... | A46B 11/0065 |
| | | | | 401/187 |
| 7,621,687 B1 * | 11/2009 | Rehkemper | ............ | A61C 17/36 |
| | | | | 401/270 |

FOREIGN PATENT DOCUMENTS

| JP | 59194702 A | 11/1984 |
|---|---|---|
| KR | 200276486 Y1 | 5/2002 |
| KR | 20120129524 A | 11/2012 |

* cited by examiner

SELF-CONTAINED ORAL-DENTAL CLEANER

TECHNICAL FIELD

The present invention refers to an autonomous oral cleaner that comprises a small container, which has been equipped with a manual pump mechanism (manual pressure device) to provide pressure inside the container, so that, after manually activating the pump, the pressure inside the container is increased and as a result, it is possible to release a liquid fluid contained within said container by activating a trigger or an activation button; where said outlet will be caused by the existing pressure inside the container; it is also highlighted that it is also possible regulate the flow of fluid at the exit.

PRIOR ART

Currently, different devices intended for oral cleaning are known in the state of the art, although they mostly require an electrical energy (alternate or continuous) that allows the operation of a motor pump to generate enough pressure inside a container container of a fluid, and thus be able to release said fluid to carry out oral cleaning.

Also known are oral cleaners that incorporate a container that is manually or mechanically endowed with an internal pressure, which is capable of moving the fluid to an outlet, controlled by a shutter, which transports said fluid through a tube or duct to an outer head equipped with the elements for oral cleaning or treatment.

In this sense, we would highlight document U.S. Pat. No. 4,803,974 or patent EP1584302, comprising the latter a sprayer that has a rigid container to contain a rinsing liquid, and includes a cap that can be opened. A manually operated pneumatic pump has a pressure line connected to the inside of the container. An outlet for the cleaning liquid is connected inside the container. The outlet and the manual pneumatic pump are located in the container plug.

Finally, the same inventor of the present invention is the holder of the application WO2020144390 in which he discloses an autonomous oral cleaner that includes a cleaning device, a container that contains a fluid, and some means to move the fluid from the interior space of the container to the cleaning device.

The means to carry out the fluid include a manual pressure device fixed to the container that is configured to provide pressure within the interior space of said container. A connection device formed by a hollow handle and a retractable hose; where one end of the retractable hose is configured to connect to a nozzle attached to the container; and where the hollow handle includes an extreme nozzle that is configured to connect the cleaning device to it.

The cleaner of this invention also includes a passage and closure fluid valve that is located inside the hollow handle; where said valve is associated with an activation trigger that is configured to be able to place the valve in a selected position between a fluid passage position and a fluid closure position.

None of these systems has been successfully introduced to the market, mainly due to their poor ergonomics, associated with their size or low ease of use.

DISCLOSURE OF THE INVENTION

In order to achieve the objectives and avoid the inconveniences mentioned in the previous sections, the invention proposes an autonomous oral cleaner that includes a head with a cleaning element, a container of a cleaning liquid fluid, and means to move the liquid fluid from the interior space of the container to the cleaning element in which a manual air pressure device participates, whose activation increases the pressure of the liquid fluid contained inside the container.

The oral cleaner comprises a single whole set, consisting of a first module that includes the head with the cleaning element, and a second module that includes the container; where said fluid is moved from the container to the cleaning element through a longitudinal conduit that communicates the container with the inside of the head and the cleaning element; and where said longitudinal conduit passes through the manual pressure device and the head in coincidence with an imaginary coaxial axis of the first and second modules.

The first and second modules of the whole set have longitudinal and coaxial mobility relative to each other to transfer the fluid from the container to the cleaning element, where, when moving the first module with respect to the second module, the manual pressure device is activated.

The cleaner of the invention also includes a passage and closure fluid valve that is located within the first module; where said valve is associated with an activation button, which is configured to be able to place the valve in a position selected between a passage position of the liquid fluid towards the cleaning element and a closure position of the liquid fluid; and where the aforementioned valve is interspersed in the longitudinal conduit.

The manual pressure device 5 comprises a plunger adjusted inside a cylindrical housing that has a side wall and a bottom with holes, with means of passage and closure of air; where said housing 8 is part of the second module; where said holes communicate with the interior space of the container; where between the plunger, the side wall and the bottom of the housing a pressure chamber is configured; and where the housing of the manual pressure device includes a coaxial tube that crosses the bottom of said housing and also the plunger, which is guided during its displacement centered on said first coaxial tube.

The manual pressure device 5 also comprises a tubular body attached by a first end to the plunger, while by a second end, opposite the first end, it is attached to the first module, while said tubular body is coaxially coupled around the coaxial tube; where the tubular holes of the coaxial tube and the tubular body constitute part of the longitudinal conduit to move the fluid from the container to the head.

The means of passage and closure of air comprise a flat joint that is coupled on the outer surface of the bottom of the housing; where said flat joint is located inside the container, so that, during the displacement of the plunger approaching (descending) to the bottom of the housing, the pressure exerted releases the passage of the holes separating the flat joint from the bottom, while when the plunger moves away from said ascending bottom those holes are closed with the flat joint.

The first module and the second module of the unique set of the invention cleaner include, respectively, a first outer cover, and a second outer cover, which constitute an ergonomic handle.

The second module includes a conical-trunk centering piece that is located in correspondence with a mouth of the housing; where said centering piece is configured to center and externally guide the movement of the first module during its longitudinal displacement through the first cover that fits into said centering piece.

The centering piece covers the fit area with the manual pressure device, at the same time it constitutes a base for the support of an interior surface of the first cover, which is in a resting position supported by its annular edge on a annular seat of the second module.

The centering piece is coupled to the second module by means of a threaded connection.

The first module of the cleaner of the invention comprises, in correspondence with its first cover, a rotating device linked to an additional plunger; where when acting on said rotating device, it rotates the additional plunger on its axis, coinciding with the imaginary coaxial axis, to strangle the fluid passage by losing the alignment of the longitudinal conduit at its confluence with a valve outlet. This allows the user to regulate the flow and/or outlet pressure of the fluid.

Thus, it is emphasized that the cleaner of the invention is a set of small dimensions, at the same time that it can incorporate different means of fastening so that a user can carry it hooked on a belt, for example, by means of a strap, located in the second module itself in correspondence with the container. There is also the possibility of being able to carry the cleaner in any bag or backpack, so it will facilitate its use in any place and/or situation (hikers, athletes, in schools, at work, etc.).

Next, to facilitate a better understanding of this descriptive memory and forming an integral part of it, a series of figures is accompanied in which, on an illustrative and non-limiting basis, the object of the invention has been represented.

BRIEF DESCRIPTION OF THE DRAWINGS

FIG. 2a.—It shows a cross-section view of a part of the oral cleaner of the invention with a plunger of the manual pressure device located in a lower position according to what is represented in FIG. 1a.

PREFERRED EMBODIMENTS OF THE INVENTION

Figures 1A, 1B:
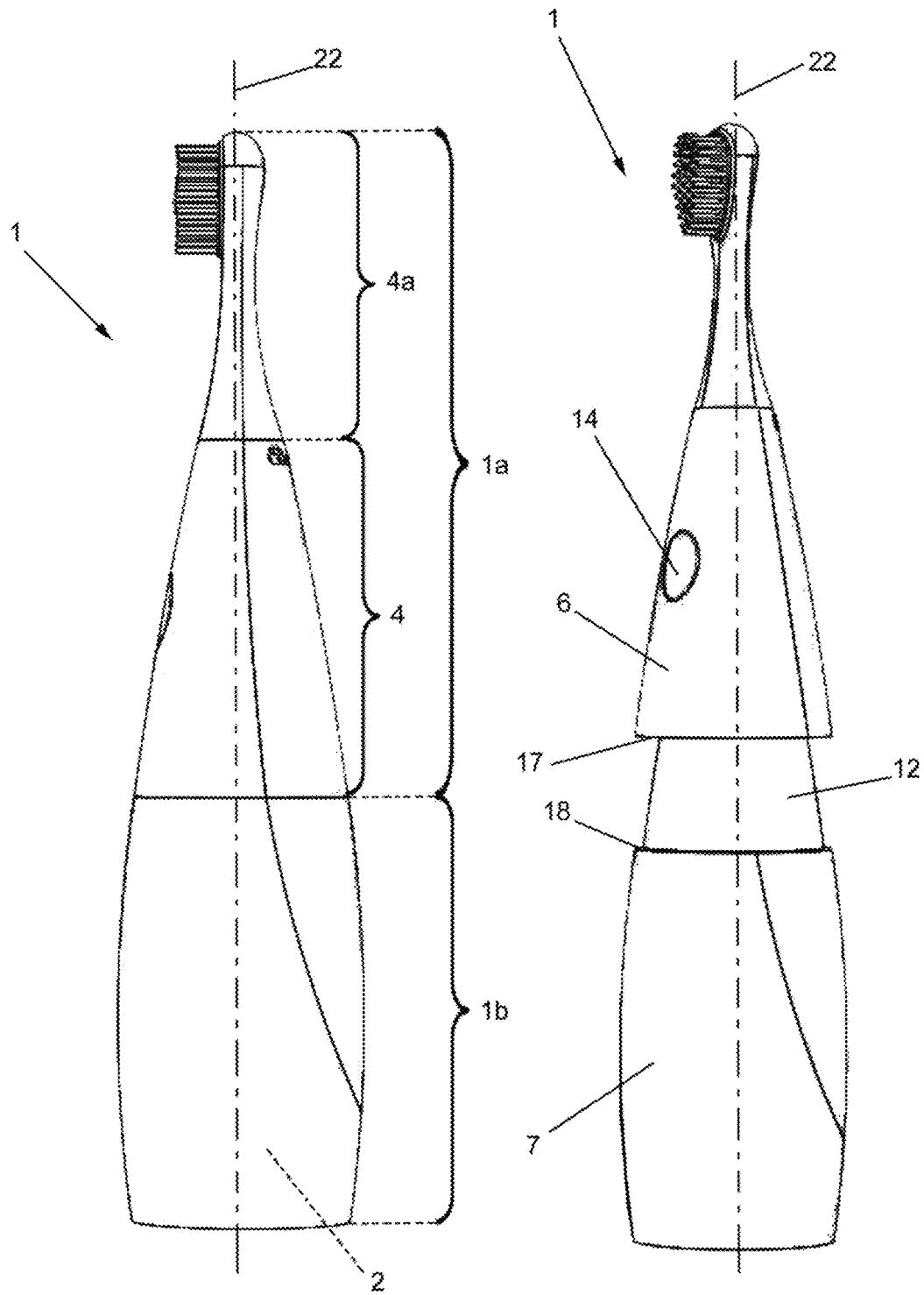
FIG. 1a.—It shows a perspective view of the autonomous oral cleaner object of the invention. The cleaner includes a manual pressure device that is in the resting position. This manual pressure device is configured to propel a liquid fluid located in a container.
FIG. 1b.—It shows a perspective view of the oral cleaner similar to the one shown in FIG. 1a, where the manual pressure device is in the actuating position.
Figure 2A:
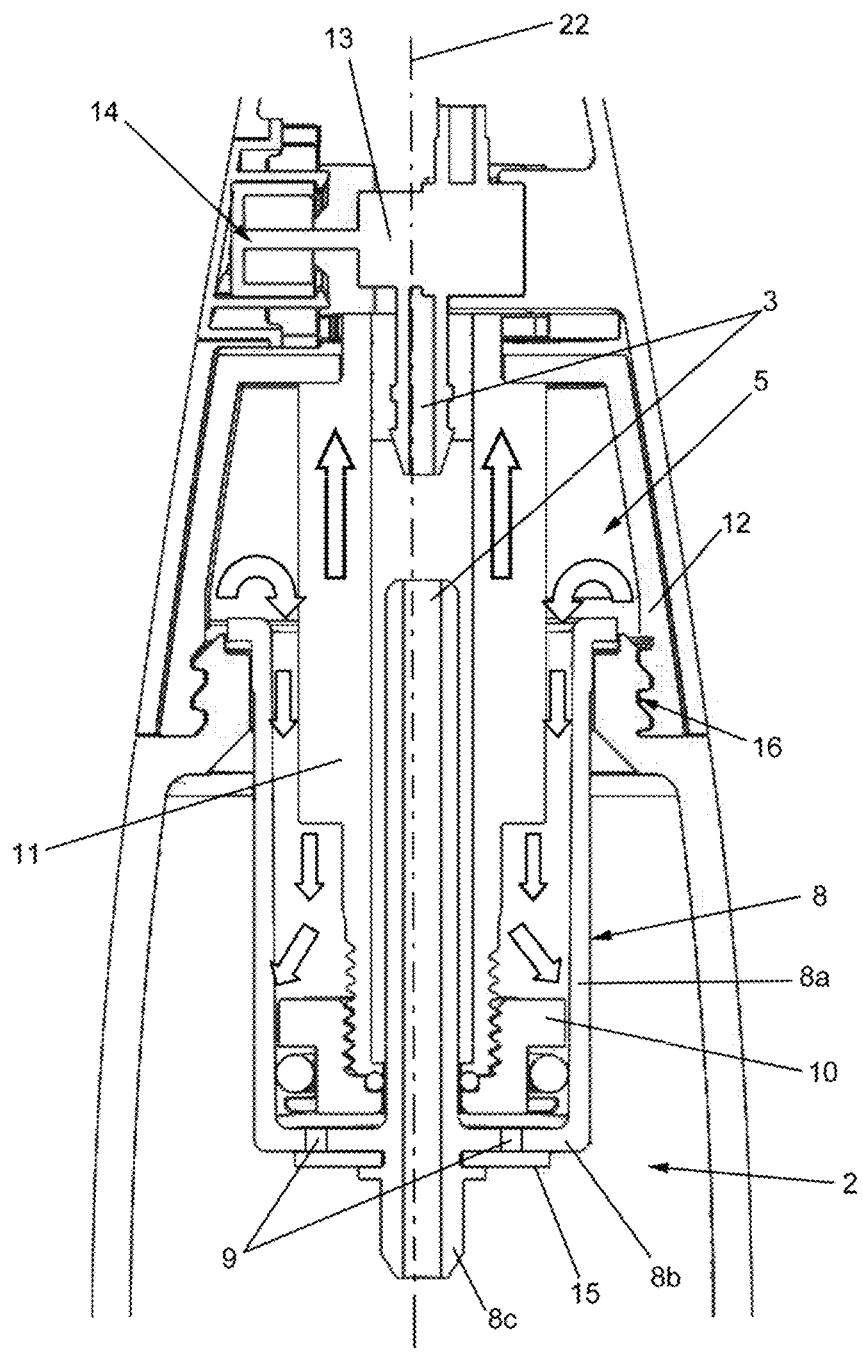
Figure 2B:
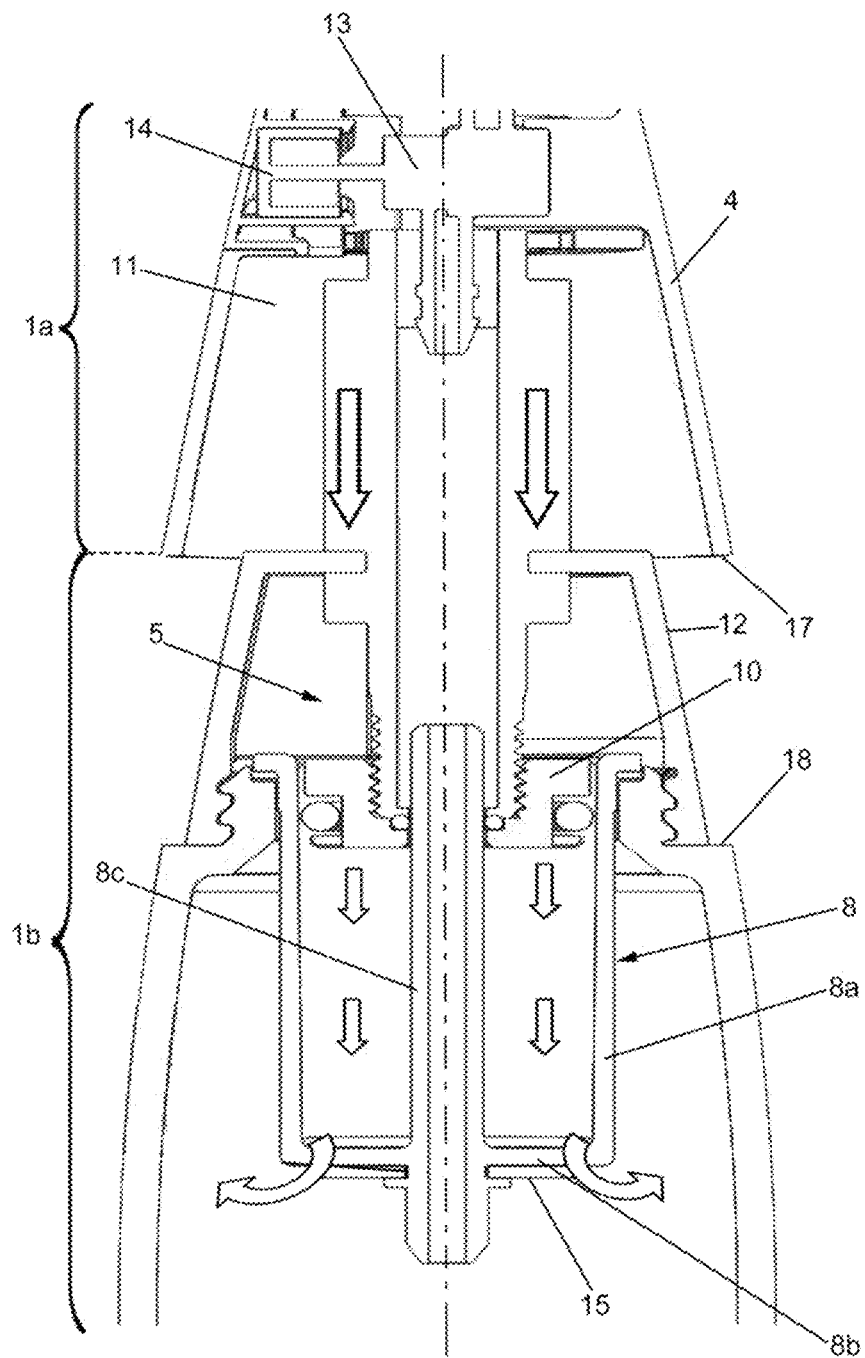
FIG. 2b.—It shows a view similar to that represented in the previous FIG. 2a, where the plunger of the manual pressure device is located in an upper position according to what is represented in FIG. 1b.

Considering the numbering adopted in the figures, the autonomous oral cleaner comprises a single integer set 1 formed by a first module 1a that includes a head 4 with cleaning element 4a, and a second module 1b that includes a container 2 that contains a cleaning fluid; where said fluid is moved from container 2 to the cleaning element 4a through a longitudinal conduit 3 that communicates the container 2 with the inside of the head 4 and the cleaning element 4a.

The oral cleaner also includes a manual pressure device 5 that is configured to provide pressure within the interior space of said container 2 and thus make it possible to transfer the fluid to the head 4, thanks to the pressure generated inside the container 2.

The first 1a and the second 1b modules of the whole set 1 have relative mobility to each other that is necessary to be able to move the fluid from the container 2 to the cleaning element 4a, so that when moving the first module 1a with respect to the second module 1b, the manual pressure device 5 is activated.

The first module 1a and the second module 1b include, respectively, a first cover 6, and a second cover 7, which provide a practical ergonomic handle during the use of the oral cleanser of the invention.

The manual pressure device 5 comprises a plunger 10 adjusted inside a cylindrical housing 8 that has a side wall 8a and a bottom 8b with holes 9 of air passage; where said housing 8 is part of the second module 1b; where said holes 9 communicate with the inner space of the container 2; and where between the plunger 10, the side wall 8a and the bottom 8b of the housing 8 a pressure chamber of variable dimension is configured depending on the location of the plunger 10.

The housing 8 of the manual pressure device 5 includes an 8c coaxial tube that crosses the bottom 8b of said housing 8 and also the plunger 10, which is guided centered in said first coaxial tube 8c during the upward and downward mobility of the plunger 10.

The manual pressure device 5 also includes a tubular body 11 attached by a first end to the plunger 10, while by a second end, opposite the first end, is attached to the first module 1a, while said tubular body 11 is coaxially coupled around the coaxial tube 8c, so that the tubular holes of the coaxial tube 8c and the tubular body 11 constitute part of the longitudinal conduit 3 to move the fluid from container 2 to the head 4.

On the outer surface of the bottom 8b of the housing 8 is coupled a flat joint 15 that is located inside the container 2, so that in its resting position it closes the holes 9 of said bottom 8b, while when the manual pressure device 5 is activated with the displacement (descent) of the plunger 10 to the bottom 8b of the housing 8, the pressurized air of the chamber of the housing 8 passes to the container 2 through the holes 9, with which the pressure is increased inside said container 2, where said pressure increase closes said holes 9 through the flat joint 15 when said displacement ends.

To achieve the necessary pressure inside the container 2 it is normally necessary to make successive movements of ascent and descent (pumping) of the plunger 10 through the first module 1a that includes the head 4, so that during the ascent inside the chamber of the housing 8 a suction effect is generated that helps to close the holes 9 of the bottom 8b by means of the flat joint 15 ensuring the successive pressure increases inside the container 2.

The second module 1b includes a conical-trunk centering piece 12 that is located in correspondence with a mouth of the housing 8, so that said centering piece 12 is configured to center and guide the displacement of the first module 1a during its displacement through the first cover 6 that fits onto said centering piece 12.

The handle of the cleaner consists of the second cover 7 of the container 2 itself and the first cover 6 displaceable with respect to the second cover 7 and axially linked to the plunger 10 of the manual pressure device 5.

Considering the vertical position of the cleaner of the invention shown in the figures, by means of a conventional unlocking mechanism by turning it, is possible to vertically move the first body 1a that includes the first cover 6 to perform the pressure load of the container 2, which is materialized through various cycles of successive vertical movements in both directions, as mentioned above, so that in a first phase the upward displacement of the plunger 10 sucks air from the outside by sending it to the chamber of the housing 8, and in a second phase of descent of the plunger 10, the air is driven inside container 2 through the holes 9 of the bottom 8a of the housing when the plunger 10 descends vertically due to the manual movement of the first body 1a that includes the first cover 6.

Here lies the main novelty of the invention since the user now has a pressure loading mechanism, the manual pressure device 5, whose drive element consists of a portion, which we have called the first cover 6 of the handle itself, which moves axially along with the rest of the first module 1a, being aligned in the same imaginary coaxial axis 22 all the elements that the new oral cleaner comprises, such as: the first module 1a that includes the cleaning element 4 and the first cover 6, the second module 1b that includes the container 2 and the centering piece 12, the manual pressure device 5 and the longitudinal conduit 3 of fluid conduction.

This morphology greatly simplifies the use of this invention cleaner, while enhancing its commercial success since it presents the same general exterior shape as the classic electric toothbrushes, so widespread today, but with the important particularity that it continues to work without the need for external pressure containers or electric drive elements.

Considering the vertical position of the cleaner of the invention shown in the figures as mentioned above, the centering piece 12 acts as the cover of an upper extreme part of the second module 1b, in correspondence with the mouth of the housing 8 that is part of the manual pressure device 5; where said centering piece 12 is coupled to the second module 1b by means of a threaded connection 16.

In addition, this centering piece 12 covers the fitting area with the manual pressure device 5, while allowing the guidance of the plunger 10 and constitutes a base for the support of an inner surface of the first cover 6, which is in a resting position supported by its annular edge 17 on a annular seat 18 of the second module 1b; endowing the set of rigidity and stability.

The cleaner of the invention also includes a passage and closure fluid valve 13 that is located within the first module 1a; where said valve 13 is associated with an activation button 14, which is configured to be able to place the valve 13 in a position selected between a fluid passage position and a fluid closing position, so that the aforementioned valve 13 is interspersed in the longitudinal conduit 3.

The operation is simple: the pressure inside container 2 is generated manually by the axial displacement of plunger 10 inside the inner chamber of housing 8 that is part of the manual pressure device 5, without having to use any type of electrical energy. Previously, it will be necessary to have filled container 2 with the cleaning liquid.

The accumulated pressure inside container 2 will propel the liquid fluid towards the cleaning element 4a of the first module, once valve 13 has been pressed or activated through the button 14.

Figure 4A:
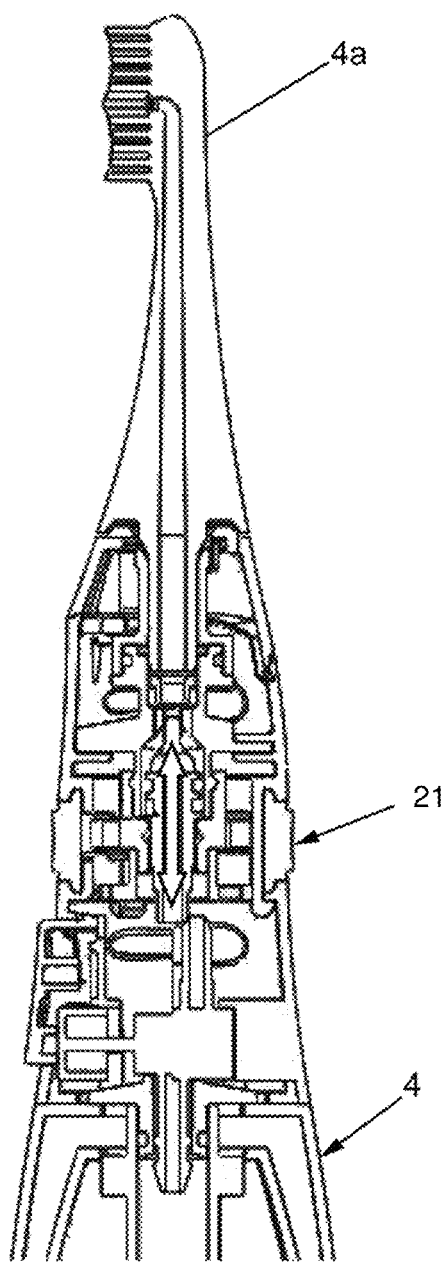
FIGS. 4a and 4b.—They show views in the section of the oral cleanser, where a simple rotating device is incorporated to be able to regulate the outlet of the liquid fluid and that acts on an additional plunger by displacing it radially, so that the fluid passage is strangled more or less depending on the desired fluid flow.
Figure 4B:
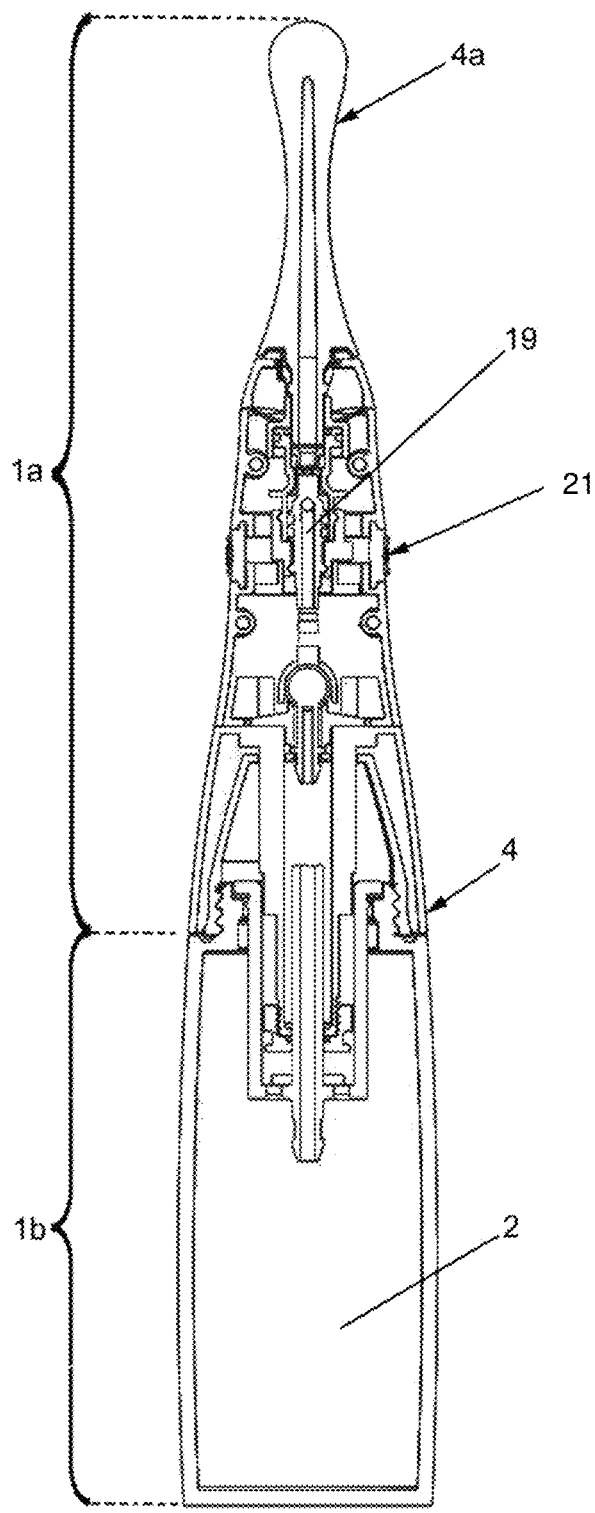
Figure 5:
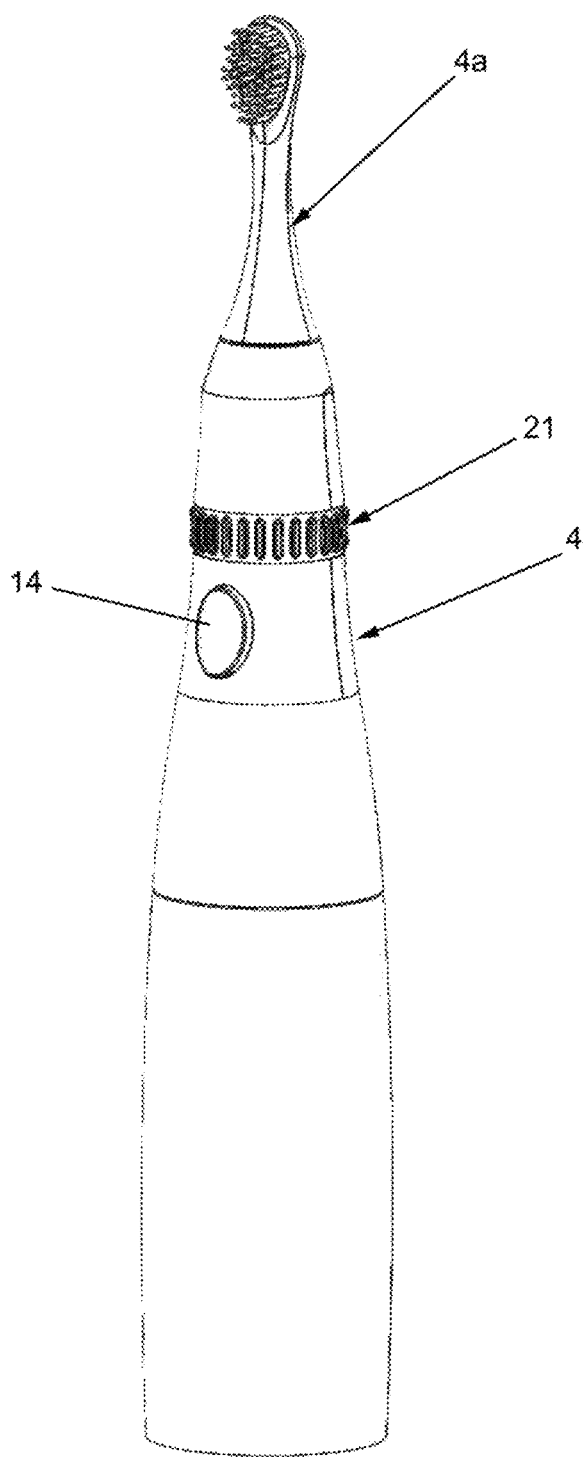
FIG. 5.—It shows a perspective view of the autonomous oral cleaner in the resting position of the realization that incorporates the rotating device to control the amount of liquid fluid that reaches the cleaning element.

In another preferred realization of the invention such as that shown in FIGS. 4a, 4b and 5, the oral cleaner comprises, in the first cover 6 itself, a conventional rotating device 21, linked to an additional plunger 19; where when acting on said rotating device 21, it rotates the additional plunger 19 on its axis (coincident with the imaginary coaxial axis 22) to strangle the passage of fluid by losing the alignment of the longitudinal conduit 3 at its confluence with an outlet of the valve 13. This allows the user to regulate the flow and/or outlet pressure of the fluid.

Figure 3:
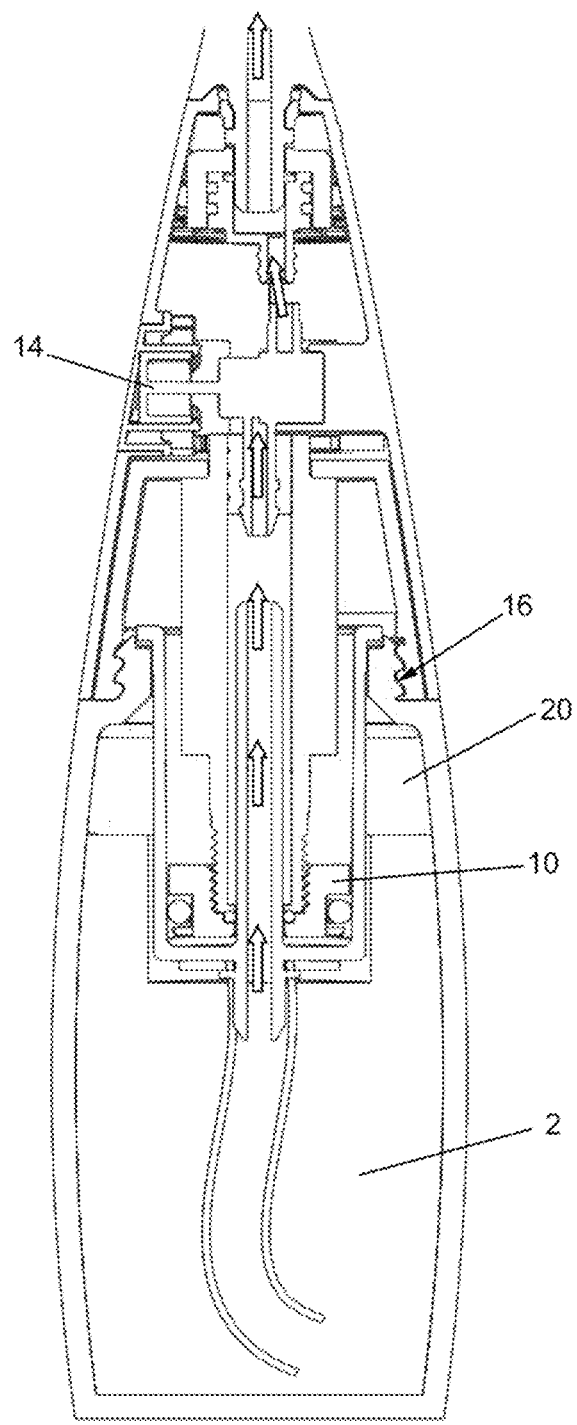
FIG. 3.—Shows a cross-section view of the oral cleaner of the invention with the exception of a cleaning element.

As shown in FIG. 3, at the top of the inner space of the container 2 and above the free level of the liquid fluid, an annular cavity 20 of air is formed around the housing 8, so that as the manual pressure device 5 is activated, the pressure within that annular cavity 20 increases progressively each time said manual pressure device 5 is activated; where said air pressure is obviously transmitted entirely to the liquid fluid contained in container 2.

The invention claimed is:

1. Autonomous oral cleaner, comprising:
a head (4) with a cleaning element (4a), a container (2) of a liquid cleaning fluid, and means to carry the liquid fluid from the interior space of the container (2) to the cleaning element (4a) in which a manual air pressure device (5) participates, whose activation increases the pressure of the liquid fluid contained inside the container (2);
a first module (1a) that includes the head (4) with the cleaning element (4a), and a second module (1b) that includes the container (2); where said fluid is moved from the container (2) to the cleaning element (4a) through a longitudinal conduit (3) that connects the container (2) with the inside of the head (4) and the cleaning element (4a); and where said longitudinal conduit (3) crosses the manual pressure device (5) and the head (4) in coincidence with an imaginary coaxial axis (22) of the first (1a) and second (1b) modules;
wherein the first (1a) and the second (1b) modules have longitudinal and coaxial mobility relative to each other to move the fluid from the container (2) to the cleaning element (4a); where when moving the first module (1a) with respect to the second module (1b) the manual pressure device (5) is activated;
a passage and closure fluid valve (13) that is located within the first module (1a); where said valve (13) is associated with an activation button (14), which is configured to be able to place the valve (13) in a position selected between a position of passage of the liquid fluid towards the cleaning element (4a) and a closing position of the liquid fluid; and where the aforementioned valve (13) is interspersed in the longitudinal conduit (3).

2. Autonomous oral cleaner, according to claim 1 wherein the manual pressure device (5) comprises:
a plunger (10) adjusted inside a cylindrical housing (8) that has a side wall (8a) and a bottom (8b) with holes (9), with means of passage and closure of air; where said housing (8) is part of the second module (2); where said holes (9) communicate with the interior space of the container (2); where between the plunger (10), the side wall (8a) and the bottom (8b) of the housing (8) a pressure chamber is configured; and where the housing (8) of the manual pressure device (5) includes a coaxial tube (8c) that passes through the bottom (8b) of said housing (8) and also the plunger (10), which is guided during its displacement of said plunger centered on said first coaxial tube (8c);

a tubular body (11) attached by a first end to the plunger (10), while by a second end, opposite to the first end, said tubular body is attached to the first module (1a), while said tubular body (11) is coaxially coupled around the coaxial tube (8c); where the coaxial tube (8c) and the tubular body (11) constitute part of the longitudinal conduit (3) to move the fluid from the container (2) to the head (4).

3. Autonomous oral cleaner, according to claim 2, wherein the means of passage and closure of air include a flat joint (15) that is coupled on the outer surface of the bottom (8b) of the housing (8); where said flat joint (15) is located inside the container (2).

4. Autonomous oral cleaner, according to claim 1, wherein the first module (1a) and the second module (1b) include, respectively, a first cover (6), and a second cover (7), which constitute an ergonomic handle.

5. Autonomous oral cleaner, according to claim 4, wherein the second module (1b) includes a conical-trunk centering piece (12) that is located in correspondence with a mouth of the housing (8); where said centering piece (12) is configured to externally center and guide movement of the first module (1a) during its longitudinal displacement through the first cover (6) that fits onto said centering piece (12).

6. Autonomous oral cleaner, according to claim 5, wherein the centering piece (12) covers a fitting area with the manual pressure device (5), and constituting a base for a support of an inner surface of the first cover (6), which is in a resting position supported by an annular edge (17) of said first cover (6) on an annular seat (18) of the second module (1b).

7. Autonomous oral cleaner, according to claim 5, wherein the centering piece (12) is coupled to the second module (1b) by means of a threaded connection (16).

8. Autonomous oral cleaner, according to claim 1, characterized by comprising, in the first cover (6), a rotating device (21), linked to an additional plunger (19); where when acting on said rotating device (21), said rotating device rotates the additional plunger (19) on an axis of the plunger, coinciding with the imaginary coaxial axis (22), to strangle the passage of fluid by losing alignment of the longitudinal conduit (3) at a confluence with an outlet mouth of the valve (13).

* * * * *